United States Patent [19]
Vasnier

[11] Patent Number: 6,081,708
[45] Date of Patent: Jun. 27, 2000

[54] MULTI-NETWORK COMMUNICATION SYSTEM FOR ORGANIZATIONS HAVING DIGITAL CELLULAR RADIO NETWORK TERMINALS

[75] Inventor: Frédéric Vasnier, Colombes, France

[73] Assignee: Alcatel, Paris, France

[21] Appl. No.: 09/035,149

[22] Filed: Mar. 5, 1998

[30] Foreign Application Priority Data

Mar. 6, 1997 [FR] France .................................. 97 02672

[51] Int. Cl.⁷ .................................................. H04B 7/00
[52] U.S. Cl. ......................... 455/426; 370/259; 370/312; 370/386; 455/432
[58] Field of Search .................................... 455/426, 422, 455/430, 432, 433, 517; 370/254, 312, 386

[56] References Cited

U.S. PATENT DOCUMENTS

| | | |
|---|---|---|
| 5,345,502 | 9/1994 | Rothenhofer . |
| 5,533,114 | 7/1996 | Ballard et al. . |
| 5,659,544 | 8/1997 | La Porta et al. ......................... 370/312 |
| 5,699,053 | 12/1997 | Jonsson ............................... 340/825.44 |
| 5,771,459 | 6/1998 | Demery et al. .......................... 455/517 |
| 5,862,480 | 1/1999 | Wild et al. ............................. 455/432 |

FOREIGN PATENT DOCUMENTS

WO9428683  12/1994  WIPO .

*Primary Examiner*—Edward F. Urban
*Assistant Examiner*—Conguan Tran
*Attorney, Agent, or Firm*—Sughrue, Mion, Zinn, Macpeak & Seas, PLLC

[57] ABSTRACT

A communication system for organizations whose communications are assured via an international private telecommunication network and at least one other network enables a user of an accredited mobile radio terminal to pre-empt the setting up of a call via the private network from a node of the network to which it has access from a base station of a radio network. Each mobile radio terminal of the system can combine a code of the country in which it is located received from a base station with a node identifying indication that it stores and for sending dialling signals including an identification code of a node and a terminal number. The nodes of the private network enable a call to be set up to a terminal from the number of that terminal reaching the node with an identification code of that node.

5 Claims, 2 Drawing Sheets

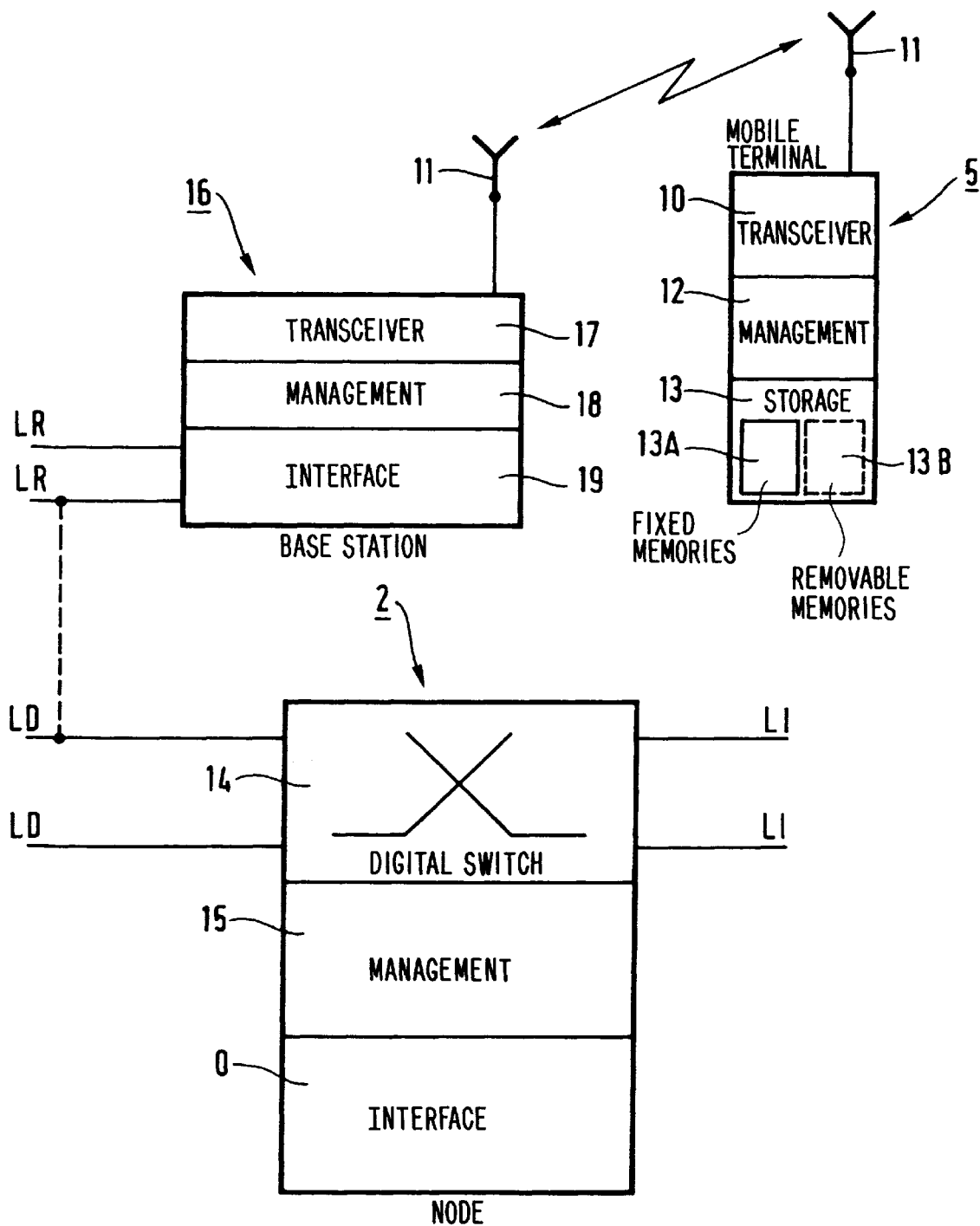

MULTI-NETWORK COMMUNICATION SYSTEM FOR ORGANIZATIONS HAVING DIGITAL CELLULAR RADIO NETWORK TERMINALS

BACKGROUND OF THE INVENTION

1. Field of the Invention

The invention concerns a communication system for organizations and in particular for businesses whose communications are assured via a private telecommunication network with international coverage and via at least one other telecommunication network, these networks enabling calls to be set up between users via terminals at least some of which are mobile radio terminals designed to communicate in a digital cellular radio network of the DECT or the GSM global mobile communication system type.

2. Description of the Prior Art

Any call involving a mobile radio terminal is set up via a base station of the cellular network within range of which the mobile radio terminal is located during at least part of the call. The base station is connected to a routing subsystem, usually of the fixed telecommunication network type, via which the call between the mobile radio terminal and another called or calling terminal is routed. The base station is generally part of a radio subsystem that assures and manages all radio transmission to and from mobile terminals and that generally includes a plurality of base stations geographically distributed over the coverage territory offered to mobile radio terminals.

In many cases the routing subsystem uses pre-existing parts of fixed networks and in particular of switched telecommunication networks, in which case it has an at least partially meshed structure and generally includes a plurality of interconnection nodes. There is then usually a choice of several possible paths for connecting a calling party and a called party, the choice being made by the manager(s) of the network(s) that can be used for the same call. Call costs and conditions can vary significantly with the path selected when there are several co-existing choices.

This fact can be exploited by large organizations and in particular the large businesses referred to above, at least some of whose calls can be assured either via their own private network or via at least one other public and/or shared network. The choice can be made by the management structure of the private network on the basis of possibilities and requirements.

In the case of calls involving a mobile radio terminal this possibility is of benefit, in particular in terms of the cost to the organization.

Although a mobile radio terminal may give users the initiative for calls when they are within radio range of a base station of a digital cellular radio network with which they are compatible, users are not usually allowed to pre-empt a communication path to a terminal with which they wish to communicate from the base station to be used as an intermediary.

SUMMARY OF THE INVENTION

The present invention therefore proposes a communication system for organizations and in particular businesses whose calls are assured partly via a private telecommunication network with international coverage and partly by at least one other telecommunication network enabling an accredited mobile radio terminal user to pre-empt the setting up of a communication path via the private network of the organization to the called terminal from a node of the private network to which it has access from a base transceiver station of a digital cellular radio network with which it is communicating when it makes a call.

In accordance with one feature of the invention each accredited mobile radio terminal includes means for combining an identification code of the geographical area, i.e. usually the country, in which it is located transmitted by radio by a base station with which the terminal is communicating with coded indications individually identifying at least some of the nodes of the private network situated in various areas which are stored in the terminal in order to have the mobile radio terminal send address information including an identification code of one of the private network nodes and a terminal number and the nodes of the private network that can be designated in this way include means enabling a call to be set up to a terminal from the number of that terminal reaching the node with an identification code specific to that node.

The invention also proposes a mobile radio terminal for communication systems of organizations and in particular of businesses whose calls are assured partly via a private telecommunication network with international coverage and partly via at least one other telecommunication network, both of which networks enable an accredited mobile radio terminal user to pre-empt the setting up of at least a part of a communication path via the private network of the organization to the called terminal from a node of the private network to which it has access from a digital cellular radio network base transceiver station with which it enters into communication when it makes a call.

In accordance with one feature of the invention the terminal includes means for combining an identification code of the geographical area in which the terminal is located transmitted by radio by a base station with which the terminal is communicating with one of the coded indications individually identifying nodes of the private network in the various areas which are stored in the terminal to enable it to generate and to transmit dialling signals associating an identification code of one of the private network nodes with a terminal number.

The invention, its features and its advantages are explained in the following description given with reference to the figures listed below.

BRIEF DESCRIPTION OF THE DRAWINGS

FIG. 2 shows a schematic relating to three of the essential elements involved in a call set up from a mobile radio terminal via a base station and a communication node.

DETAILED DESCRIPTION OF THE PREFERRED EMBODIMENT

Figure 1:
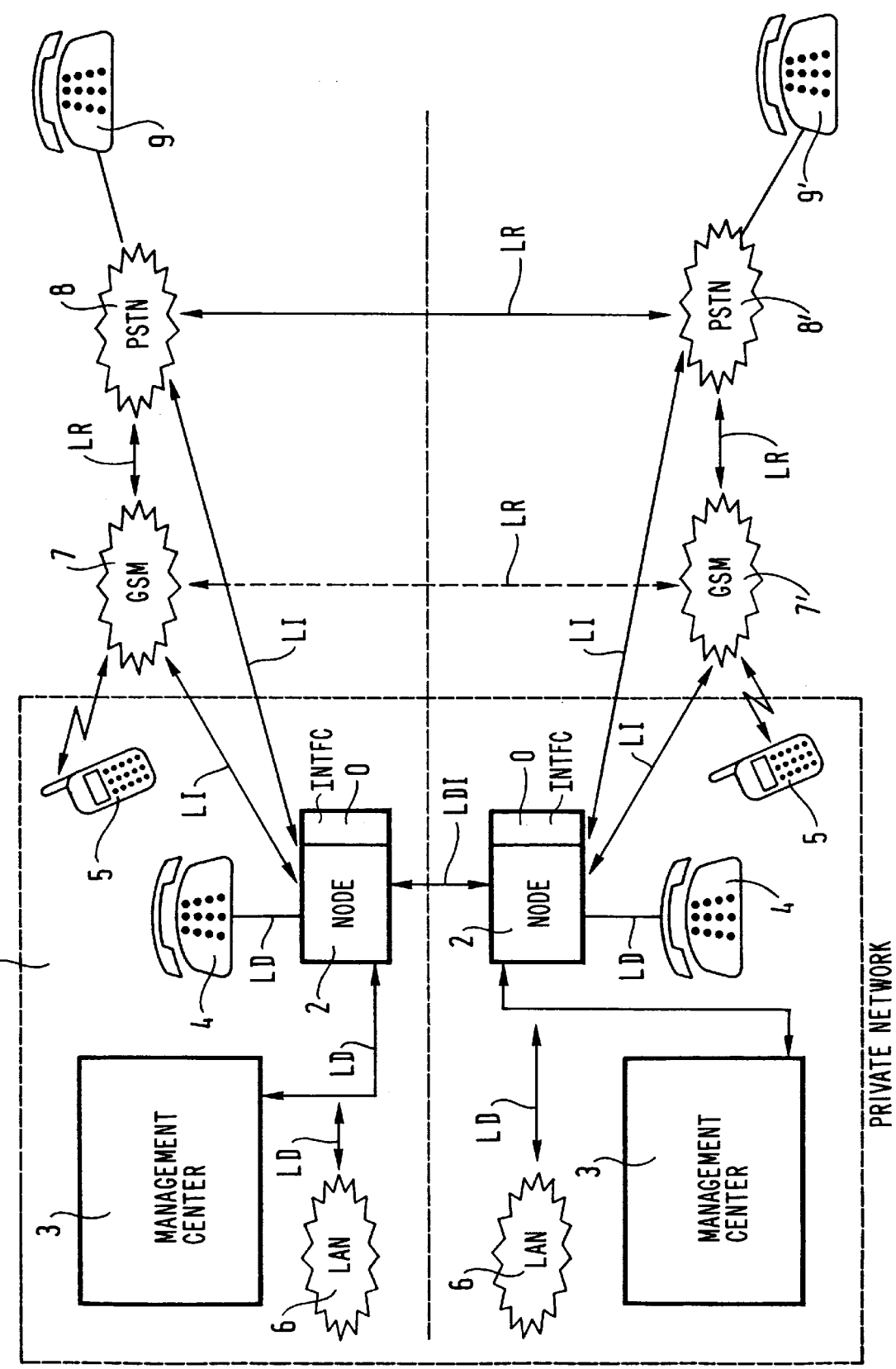
FIG. 1 shows a block diagram of a multi-network communication system for organizations using mobile radio terminals.

The multi-network communication system shown in FIG. 1 assures the communications of an organization, for example a multinational business, which has its own private telecommunication network 1. The network includes a plurality of nodes 2 each based on a switch that has a particular geographical location and through which pass calls set up between terminals connected to it by cable or by radio. Calls are set up either directly or through the intermediary of other nodes which can be nodes of the network 1 or nodes of one or more other shared telecommunication networks, for example public networks.

The nodes of the private network 1 are based on at least one switch to enable synchronous or asynchronous voice and/or data call set-up. At least some of them also include interface equipment 0 enabling them to process at least some of the information transmitted in calls across a digital cellular radio communication network.

Each node has communication links that connect it to other nodes, usually point-to-point links, in accordance with local possibilities and requirements. Calls between two nodes of the private network 1 can be set up in various ways and in particular via leased lines LD that are used only by the organization owning the network 1 and/or via interface links LI between networks that are usually exploited on a call by call basis and for a limited time period.

The links use fixed hardware for electrical, optical or radio transmission, depending on the situation.

All of the private network nodes 2 are supervised by a supervisory entity which includes one or more management centers 3 and is responsible for management of internal traffic in the network. This entity can provide the traffic management interface to like entities of other networks with which or through which the network 1 may be required to communicate.

In a preferred embodiment at least some of the links between nodes 2 of the private network are organized into a particular communication structure known as an "Intranet" and are managed in a coordinated manner by the supervisory entity of the private network.

The private network 1 makes a plurality of communication terminals available to users accredited by the organization operating it. Here the terminals are divided into fixed terminals 4 and mobile radio terminals 5. The terminals 4 include all equipment for which calls are necessarily set up via the node to which they are fixedly connected, usually by wire or by cable. They also include terminal equipment with a fixed transmit-receive base to enable the use of a short-range mobile transceiver handset.

Here the mobile radio terminals are digital cellular radio network terminals, as already indicated, and in particular terminals compatible with a system such as the global mobile communication system designated by the acronym GSM and/or the European system designated by the acronym DECT.

The example shown schematically in FIG. 1 assumes two areas, i.e. generally two countries, a common border of which is symbolized by the horizontal dashed line across the middle of the diagram and in which an organization has a private network 1 that includes at least one node 2 in each area and in which accredited users from the organization are provided with fixed terminals 4 and/or mobile terminals 5. The diagram shows a management center 3 of the supervisory entity of the private network 1 in each area.

Each node 2 is connected by a plurality of leased lines LD to the fixed terminals 4 of the accredited users of the organization in the area in which it is located.

At least some of the terminals concerned may be connected to the node 2 by a line LD connected to a shared communication structure 6 such as a local area network LAN.

In FIG. 1 two nodes 2 in different areas are connected by at least one international leased line LDI, possibly by at least one other communication network independent of the organization.

In the example shown each node 2 of the private network 1 is connected by interface links LI to a node, not shown, of a digital cellular radio network 7 or 7', here of the GSM type, and to a node, not shown, of a communication network 8 or 8' independent of the organization, for example a public switched telephone network of the type conventionally designated by the acronym PSTN. There are also links LR between nodes of the networks 8 and 8' and possibly between nodes of the networks 7 and 7'. Links are also provided between nodes of the networks 7, 8 and 7', 8'. They all allow communication between terminals other than those of the private network 1, as symbolized by the terminals 9 and 9' for the networks 8 and 8'.

A communication system organized in the above manner conventionally allows a user having a fixed terminal connected to the private network 1 and located in one of the areas to enter into communication with another user also having a fixed terminal connected to the private network exclusively via links of the private network.

The choice of a communication path, either via the private network alone or via at least a part of the private network and a part of an independent network for setting up a call, can be left to the initiative of the calling user provided with a mobile radio terminal of the invention. It can equally be placed under the control of the supervisory entity or more particularly of a management center 3 of that entity.

This is conventionally obtained by using different numbers to pre-empt one path rather than another for a call.

In one embodiment of the invention a user, referred to herein as an accredited user, of the private network 1 who has a mobile radio terminal 5 is allowed the initiative in terms of choosing the path to be set up for a call that they are requesting to another user present in an area other than that in which it is itself located, so that the path uses at least one of the international leased lines LDI of said private network 1, as soon as this is feasible.

To this end a mobile radio terminal 5 enabling such choice includes specific means associated with the usual means of a mobile radio terminal for communicating with another fixed terminal or mobile radio terminal via a digital cellular radio network such as the network 7 or 7' within radio range of which it is located.

The usual means with which a mobile radio terminal is provided are well known to the skilled person and for this reason are not described in detail here. They combine radio communication means, means 12 for managing the various communication operations and means 13 for storing information. Here the radio communication means are represented by a transceiver 10 connected to an antenna 11. The management means 12 are based on at least one appropriately programmed processor, the programs being stored by the storage means 13 which consist of memories having particular locations and types which vary with constraints and requirements.

The mobile radio terminals include fixed memories 13A that are installed permanently and removable individualization memories 13B adapted to be inserted and removed after assembling the terminal. The individualization memories are incorporated in a plug-in module, for example, such as a subscriber identification module SIM which must be connected if the terminal is to function. The SIM module is assigned to a particular user and contains coded information identifying that user and for personalizing the operation of the terminal, the latter information relating in particular to the type of subscription entered into by and/or on behalf of the user.

In the present instance there is provision for storing data corresponding to coded identification indications relating to the nodes of the private network in respect of which a user is accredited in a memory 13A or 13B of the mobile radio terminal allocated to them.

The coded indications identifying the nodes are conventionally numeric or alphanumeric codes, as are the terminal numbers. Like the latter numbers, they can be stored in memory as binary data and transcoded for transmission, for example in multifrequency code.

A node identification code is therefore obtained by transcoding the identification indications specific to that node. The identification codes of the nodes stored in a mobile radio terminal are used to establish interzone calls in areas into which the terminal may be taken by a user.

The storage in memory and refreshing of the node identification data of at least some of the nodes of a private network can be performed either by accredited users themselves, employing a directory data input program on the mobile radio terminal they are using or, for example, by downloading an update when the mobile radio terminal begins to communicate with one of the nodes of the private network 1.

Current digital cellular radio networks transmit to mobile radio terminals by radio area identification codes enabling each terminal to know the geographical area in which a base station 16 with which it is currently able to communicate is located. Each geographical area corresponds at present to a different country and the identification code corresponding to it is routinely called the country code for this reason. For reasons of wider generality the word "area" is usually substituted for the word "country" in this document, in that the system of the invention is potentially exploitable with a geographical division in which the areas correspond to groups of countries or to separate identifiable parts of countries.

Thus a mobile radio terminal user, for example a user of a GSM type terminal, can at virtually any time find out the area in which they are located and possibly any border area with a base station 16 with which it is communicating or can communicate depending on its present location.

In accordance with the invention, the combinations of binary data back-transcoded from the area identification codes are combined by the management means 12 of the radio mobile terminals 5 of an organization operating a system in accordance with the invention with the identification data of the nodes of the private network of that organization which are stored in one of the memories 13A or 13B of mobile radio terminals equipped for this purpose. This enables each terminal to produce information that can be exploited to pre-empt the setting up of at least a part of the communication path via the private network of the organization in the case of an outgoing international call initiated from that terminal.

There are of course various ways to exploit the combination obtained from an area identification code and with one of the indications identifying nodes of the private network stored in a mobile radio terminal, depending on the content of such information and on the respective organizations of the communication networks concerned, in particular with reference to the nodes and their interconnecting links.

At present, as already indicated, the area identification code supplied to a mobile radio terminal by a base station 16 within radio range of which it is located generally relates to the country in which the terminal is then located, it being understood that this is not necessarily the case if the terminal is in a border region between areas or countries.

In the present example, regardless of which of the above applies, the back-transcoded combination derived from an area identification code transmitted by a transmitter-receiver 17 of a base station 16 is used to select one of the private network node identification indications by the mobile radio terminal in accordance with the invention acting on that indication.

This is triggered by the user of the mobile radio terminal, for example, who selects an option at their terminal which is equipped and/or programmed accordingly. Alternatively, it can be programmed automatically in an initialization phase of an interzone call as soon as the management means of an accredited terminal detect an action of the user that is characteristic of an interzone call request, for example pressing a particular key in the context of a series of particular operations.

Pressing an appropriate key selects the required menu, for example, as is usual in the art. Selecting the option from those proposed in the menu containing them by a similar operation causes the area identification code then received by the terminal to be acted on to select identification indications of the private network node intended to be used to set up an interzone call via the terminal. The identification code of that node is then obtained by transcoding, for example in the management means 12 of the terminal, and is associated with the number of a terminal to be reached that the user has selected in order to be sent with the number to the base station 16 within radio range of which the terminal and its user are located. In the case of a GSM terminal the data corresponding to the identification code of a terminal and the identification code of a private network node via which the call is to be set up are associated in the same packet of data, known as the initial packet, which is transmitted by radio by the terminal after transcoding the data that it contains for the purposes of such transmission.

The node identification code received from a mobile radio terminal by the base station 16 with which it is communicating is used by the management unit 18 of that station to set up a call with the private network node identified in this way via a network communication interface 19. The communication is set up from the network communication interface 19 via the routing subsystem of the digital cellular radio network including the station and via at least one of the interface links LI between the private network and the radio network.

The wanted information, in particular the node identification code and the terminal number, contained in the initial packet received from the mobile radio terminal by the base station 16 is transmitted, after back-transcoding and appropriate shaping, to the destination node via the path between that station and the node, and the same goes for the part to be transmitted of packets transmitted later for the same call by the mobile radio terminal. This identifying code and the terminal number are recovered at the identified node 2, which is conventionally a switch, of the type routinely called a PABX, in particular provided with digital switching means 14 to which are connected interface links LI and dedicated links LD via which the switch communicates.

The switch constituting a node 2 also includes a management unit 15 conventionally organized around at least one processor, not shown, and one interface equipment 0 enabling it to treat at least some of the information transmitted during calls crossing a digital cellular radio network. The interface equipment 0 receives at least some of the useful information of an initial packet and verifies that the packet is addressed to it by comparing the identification code contained in the packet with that of the node which includes it. If so, the interface equipment allows for the number contained in the initial packet and begins to communicate with the management unit 15 of the node in order to establish a path of communication from the node to the terminal whose number has been received. The node management unit connects to the private network management entity of which it is part in order to set up the path to this terminal regardless of its nature and its situation and that of a return path for the information that will be transmitted from the called terminal to the calling terminal via the node initially identified and the base station 16 with which the calling terminal is communicating. This return path is established allowing for the data contained in the initial packet that corresponds to the number specific to the calling mobile radio terminal. The two return paths set up between the identified node and the base station 16 of the digital cellular radio network initially used during the call can be modified in the manner that is usual in the art if the movement of the mobile radio terminal implies a change of base station during the call.

The private network management entity 1 assures the provision of the return paths which are required for a call in accordance with its pre-programming and the communication possibilities then offered by the private network and if necessary by the other network(s) whose communication links it can possibly use.

A mobile radio terminal of a communication system in accordance with the invention can of course establish interzone communication without passing through the private network of the organization of which it depends, using a conventional call procedure different from that referred to above and in the context of which there is no provision for sending the identification code of a private network node in the event of a call, even if a procedure of this kind is authorized for the user.

There is claimed:

1. A communication system for organizations wherein:

communications are assured partly by (1) a private telecommunication network, having international coverage, and by (2) at least one other telecommunication network, said private telecommunications network having private network nodes;

said communication system enables a user of an accredited mobile radio terminal to pre-empt the selection of at least part of a communication path by routing a call to a respective terminal through a respective one of said nodes of said private telecommunication network;

said accredited mobile radio terminal has access to said respective node of said private telecommunication network via a base transceiver station of a digital cellular radio network;

said accredited mobile radio terminal comprises:

means for storing coded indications individually identifying at least one of said nodes of said private telecommunications network, means for combining an identification code, representing a geographical area in which said accredited mobile radio terminal is located, with at least one of said coded indications, to produce a combined code, and means for enabling said mobile radio terminal to transmit address information, said address information comprising:

a private network node identification code, and a terminal number of said respective terminal; and said private network nodes comprise means for enabling said call to be placed to said respective terminal from said terminal number reaching said node with said identification code of that node.

2. A mobile radio terminal for use in a communication system of an organization, wherein:

communications are assured partly (1) by a private telecommunication network, having international coverage and (2) at least one other telecommunication network, said private telecommunication network having private network nodes;

said private telecommunication network and said other telecommunication network both enable an accredited mobile radio terminal user to select at least a part of a communication path, by routing a call to a respective terminal through a respective node of said private telecommunication network;

said accredited mobile radio terminal has access to said respective node of said private telecommunication network via a base transceiver station of a digital cellular radio network; and said mobile radio terminal comprises:

means for storing coded indications individually identifying at least one of said private network nodes, means for combining an identification code, representing a geographical area in which said mobile radio terminal is located, with one of said coded indications, and means for enabling said mobile radio terminal to generate and transmit signals, wherein said signals include:

an identification code for one of said private network nodes, and a terminal number of said respective terminal.

3. The mobile radio terminal of claim 2 further comprising a memory for storing therein said coded indications, wherein said coded indications identify said private network nodes in various geographical areas.

4. The mobile radio terminal of claim 2, further comprising a subscriber identification module, storing therein said coded indications, wherein said coded indications identify said private network nodes in various geographical areas.

5. The mobile radio terminal of claim 2, wherein said terminal is of the Global System for Mobiles (GSM) or Digital Enhanced Cordless Telecommunications (DECT) type.

* * * * *